March 19, 1946.                C. L. HAMBELTON                2,397,003
                                UNIVERSAL JOINT
                              Filed Feb. 13, 1945
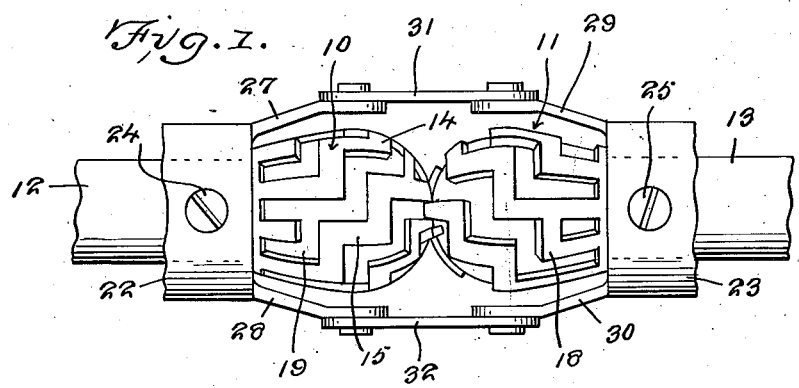
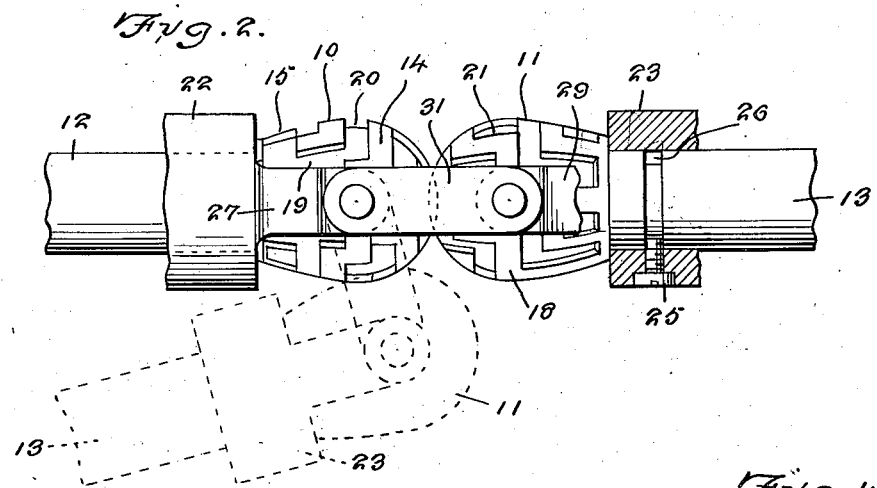
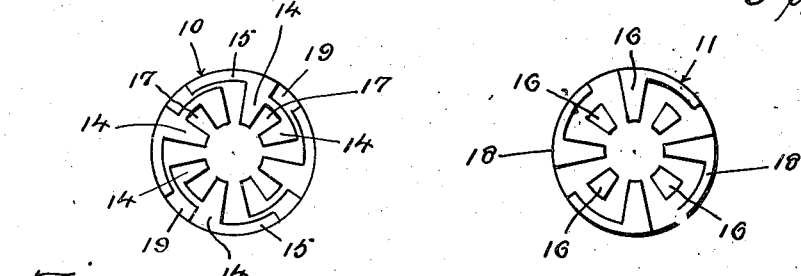
Charles L. Hambelton
INVENTOR
BY Victor J. Evans & Co.
ATTORNEYS Patented Mar. 19, 1946

2,397,003

UNITED STATES PATENT OFFICE 2,397,003

UNIVERSAL JOINT

Charles L. Hambelton, San Francisco, Calif.

Application February 13, 1945, Serial No. 577,615

5 Claims. (Cl. 74—380)

My invention relates to new and useful improvements in universal joints.

An important object of my invention is to provide a universal joint comprising cooperative heads having teeth adapted to rotate at varying angles.

Another object of my invention is to provide a universal joint that is capable of a comparatively great angular adjustment and that will in no way retard the rotary movement of the drive and driven shafts.

Still another object of my invention is to provide a universal joint wherein the teeth of the companion heads are unique in their formation to prevent lateral movement therebetween.

Yet another object of my invention is the provision of a universal joint that is simple in construction, efficient and efficacious in the performance of its duties, and inexpensive to manufacture.

Other objects and advantages of my invention will be apparent during the course of the following description.

In the drawing, forming a part of this specification, and in which like numerals are employed to designate like parts throughout the same, Figure 1 is a top plan view of a device embodying my invention;

Figure 2 is a side elevation thereof;

Figure 3 is a top plan view of the crown of one of the cooperative heads embodying a part of my invention, and Figure 4 is a top plan view of the crown of the other of the heads embodying a part of my invention.

In the accompanying drawing, wherein for the purpose of illustration, is shown a preferred embodiment of my invention, the numerals 10 and 11 designate substantially pear-shaped cooperative heads having shanks 12 and 13.

The head 10 is formed with diametrically opposed, right angularly disposed, U-shaped teeth 14 at the crown thereof, and with the free ends of the arm portions of the teeth converging toward the center of the crown to substantially define a Maltese cross formation. The sinuous or zigzag teeth 15 extend from corresponding corners of each of the U-shaped teeth 14, obliquely and in spaced parallel relation, to the base of the head. The teeth 14 and 15 on the head 10 are adapted to mesh with the teeth of the head 11.

The head 11 is formed at its crown with diametrically opposed, right angularly disposed, fins 16 adapted to be interlockingly received within the space 17 defined by the U-shaped teeth 14 on the head 10. The inner ends of the sinuous or zigzag teeth 18 are positioned in bisecting relation to the fins 16 and are adapted to be interlockingly received in the concavities 19 defined by adjacent arms of the U-shaped teeth 14. The teeth 18 extend in a sinuous or zigzag manner, obliquely and in spaced parallel relation, to the base of the head.

Inasmuch as the pitch between the teeth or threads formed on the heads 10 and 11 are the same, the teeth 18 will be accommodated in the root 20 between the teeth 15 on the head 10, and the teeth 15 will correspondingly be received in the root 21 defined by adjacent teeth 18 on the head 11.

The sleeves 22 and 23 receive the shanks 12 and 13, respectively, and carry screws 24 and 25 the inner ends of which project into annular grooves 26 provided in the shanks adjacent the head portions 10 and 11. The collars 22 and 23 are formed with forwardly extending bifurcations 27, 28 and 29, 30, respectively, which extend forwardly thereof and in spaced relation with the heads 10 and 11 but terminate a substantial distance from the crowns thereof. The link members 31 and 32 pivotally connect the free ends of the bifurcations to hold the teeth in interlocking meshed relation. The bolts 24 and 25 will ride in the grooves 26 to prevent relative longitudinal movement between heads, but will permit the same to be moved in various angular positions, as illustrated by the dotted lines in Figure 2. By virtue of the fact that the heads 10 and 11 are of the same size and shape, and because of the sinuous or zigzag formation of the teeth formed thereon, the proper meshing of the teeth will be assured regardless of the relative angular position between the heads, and lateral movement therebetween will be substantially eliminated. Either of the shanks 12 or 13 may constitute the drive shaft, and the driving force will be transmitted to the driven shaft regardless of its angular relation with respect to the said drive shaft. The annularly disposed portions of the sinuous teeth 15 and 18 will interlock when a pivotal stress is applied to the drive and driven shafts to move the heads 10 and 11 into a more acute angular relation, and because of this interlocking co-action, thrust on one or the other of the shafts will prevent slippage of the heads with respect to each other, and similarly, the rotary motion will in no way be impaired.

It is to be understood that the form of my invention, herewith shown and described, is to be taken as a preferred example of the same, and that various changes in the size, shape and arrangement of parts may be resorted to without departing from the spirit of my invention, or the scope of the appended claims.

I claim:

1. In a universal joint, the combination of substantially spherically curved cooperative heads having shanks, said heads having intermeshing teeth extending zigzag fashion angularly from the base to crown thereof; collars rotatably receiving the said shanks and having bifurcations extending forwardly thereof and spaced from the said heads; and link members pivotally connecting the said bifurcations, in a manner to hold the teeth of the said heads in meshed engagement, the zigzag nature of the teeth permitting angular adjustment of the shanks but preventing thrust on one of the shanks from causing slippage of the heads relative to each other.

2. In a universal joint, the combination of substantially spherically curved cooperative heads having shanks provided with annular grooves, said heads having intermeshing teeth extending zigzag fashion angularly from the base to crown thereof; collars rotatably receiving the said shanks and having bifurcations extending forwardly thereof and spaced from the said heads; link members pivotally connecting the said bifurcations and holding the teeth of the said heads in meshed engagement; and pins carried by the collars and received within the annular grooves of the shanks to prevent relative longitudinal movement between the said heads, and the zigzag nature of the said teeth preventing thrust on one of the shanks from causing slippage of the heads relative to each other.

3. In a universal joint, the combination of substantially spherically curved cooperative heads, one of said heads having teeth at its crown substantially defining a Maltese cross formation and with teeth extending zigzag fashion obliquely from the said cross formation to the base of the head; and the other of said heads having right angularly disposed fins at the crown thereof, and teeth bisecting the said fins and extending angularly zigzag fashion therefrom to the base of the head, the teeth of the heads being adapted to mesh in a manner to prevent slippage of the heads relative to each other.

4. In a universal joint, the combination of substantially spherically curved cooperative heads having shanks, one of said heads having teeth at its crown substantially defining a Maltese cross formation and with ridges defining teeth extending in zigzag fashion angularly from the said cross formation to the base of the head; the other of said heads having right angularly disposed fins at the crown thereof, teeth bisecting the said fins extending angularly therefrom to the base of the head, the teeth of the heads being adapted to mesh in a manner to prevent thrust on one of the shanks from causing slippage between the heads, collars rotatably receiving the said shanks and having bifurcations extending forwardly thereof and spaced from the said heads, and link members pivotally connecting the said bifurcations to hold the teeth of the said heads in meshed relation with each other.

5. In a universal joint, the combination of substantially spherically curved cooperative heads having shanks formed with annular grooves, one of said heads having teeth at its crown substantially defining a Maltese cross formation and with teeth extending zigzag fashion angularly from the said cross formation to the base of the head; the other of said heads having right angularly disposed fins at the crown thereof and teeth bisecting the said fins, extending angularly therefrom to the base of the head, the teeth of the heads being adapted to mesh in a manner to prevent thrust on one of the shanks from causing slippage between the heads; collars rotatably receiving the said shanks and having bifurcations extending forwardly thereof and spaced from the said heads, link members pivotally connecting the said bifurcations to hold the teeth of the said heads in meshed relation; and pins carried by the collars and received within the annular grooves of the shanks to prevent relative longitudinal movement between the said heads.

CHARLES L. HAMBELTON.